Figure 1:
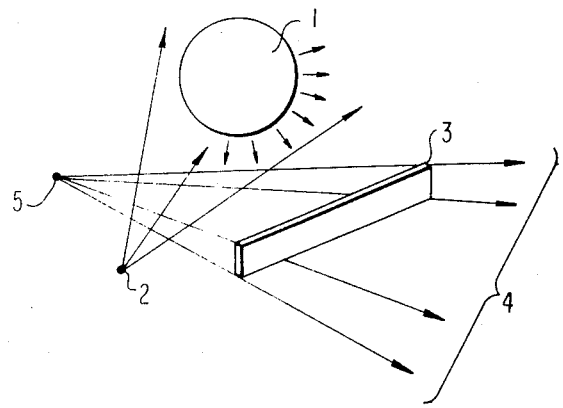

United States Patent
Kimura

[11] 3,834,785
[45] Sept. 10, 1974

[54] VERTICALLY DIVERGED HOLOGRAPHIC IMAGE FORMATION WITH ZERO-ORDER DIFFRESSION SUPPRESSION

[75] Inventor: Yoshiaki Kimura, Masanaui Kawai, Tokyo, Japan

[73] Assignee: Konishinoku Photo Industry Co., Ltd., Tokyo, Japan

[22] Filed: Jan. 24, 1973

[21] Appl. No.: 326,351

[30] Foreign Application Priority Data
Jan. 24, 1972 Japan.................................. 47-8301
Mar. 15, 1972 Japan............................... 47-25756

[52] U.S. Cl............................. 350/3.5, 350/162 SF
[51] Int. Cl. .......................................... G02b 27/00
[58] Field of Search ................ 350/3.5, 162 SF, 206

[56] References Cited
UNITED STATES PATENTS

| | | | |
|---|---|---|---|
| 2,846,918 | 8/1958 | Miles................ | 350/175 E |
| 3,580,655 | 5/1971 | Leith et al. ........... | 350/3.5 |
| 3,598,471 | 10/1971 | Baldwin et al................ | 350/162 SF |
| 3,625,584 | 12/1971 | St. John................ | 350/3.5 |
| 3,633,989 | 1/1972 | Benton................... | 350/3.5 |
| 3,744,878 | 7/1973 | Kiemle et al. .................. | 350/162 SF |

*Primary Examiner*—Ronald J. Stern
*Attorney, Agent, or Firm*—Browne, Beveridge, DeGrandi & Kline

[57] ABSTRACT

In a holographic image formation apparatus and method it has been known that the vertical components of image may be spread to achieve a wide vertical angle of observation without destroying the image nor impairing the three dimensional effect obtainable with a pair of eyes arranged horizontally with respect to each other. This has been done by the employment of a horizontally disposed cylindrical lens plate, usually near the plane of the recorded image, but optionally arranged elsewhere. Overlapping and loss of image clarity and contrast occurs in such a system due to the fact that the zero order of diffracted images and the first, or higher, orders partially superimpose one upon the other. In this invention a special mask is arranged beyond the lens plate which may be adjacent the recorded image to be reconstructed, in which the mask has opaque zones which correspond to the spacing of the individual cylindrical lens elements comprising a lens plate used for the vertical dispersion of the lines of images along the recorded image. According to this invention narrow opaque strips are disposed parallel to these cylindrical lens elements at a distance therefrom such that the elumination beam passing linearly through the recorded image tends to focus on the opaque strips whereas the first and higher order diffraction beams pass between such opaque strips, whether illuminated by monochromatic light or a series of color bands.

6 Claims, 7 Drawing Figures

VERTICALLY DIVERGED HOLOGRAPHIC IMAGE FORMATION WITH ZERO-ORDER DIFFRACTION SUPPRESSION

This invention relates to an image forming method, and more particularly to a method of forming a three dimensioned image utilizing the principle of holography.

The holography wherein an object image can be observed from various points over a wide range is generally called wide angle holography. Among several methods prepared in the wide angle holography, the typical one mainly used at present is that wherein a holographic photosensitive material or materials are arranged around an object so that the object may be surrounded by the photosensitive material over a wide range. For example, a method in which a curved film arranged around an object in the shape of circular arc is disclosed in "Optics and Spectroscopy," Vol. 24, p. 333, 1968. A method in which a plurality of photographic plates are arranged around an object is disclosed for example in "Applied Optics," Vol. 9, No. 6, p. 1479, 1970. In these methods, the visual field from which the object can be observed is determined by the dimension of the holographic photosensitive material used in recording the hologram. Accordingly, it has been necessary to use a photographic material of large dimension, i.e., a large photosensitive material or a number of pieces of photosensitive material, in order to obtain a large visual field. In order to eliminate the above mentioned disadvantage of the conventional methods of holography, the present invention provides a method of forming an image, particularly of reconstructing a holographically recorded image, by use of a cylindrical lens plate disposed between an observation system and a hologram. Further, the present invention provides a method of reconstructing a three dimensional image of an object on the basis of the above method utilizing a cylindrical lens plate.

From the viewpoint of stereoscopic perception of a three dimensional display, the vertical parallax of the object does not contribute so much to the three dimensional perception since human's eyes are horizontally arranged. Therefore, in many cases, it is practically sufficient to provide parallax in only one direction for a displayed image. On this point, the method wherein a cylindrical lens plate is used to expand the light for image reconstruction in only one direction and broaden the visual field is effective. In such a method, however, a zero-order diffracted light which does not contribute to image formation is expanded at the same time that the light bundle for forming a real image is expanded by the use of the cylindrical lens plate, and accordingly, the zero-order diffracted light comes incident to the observation system together with the object light (light diffracted for focussing a real image) even if the angle between the object light and the reference light is made relatively large at time of recording the hologram. Consequently, the S/N ratio is markedly lowered and the contrast of the image is lowered, and it becomes impossible to obtain an image of high quality.

Accordingly, the primary object of the present invention is to provide a method of forming a practical three dimensional image having a parallax in only one direction.

Another object of the present invention is to provide a method of forming a three dimensional image having a wide visual field, i.e., an image which can be observed from various points over a wide range, by use of photosensitive material of small size.

Still another object of the present invention is to provide a holographic image reconstructing method using a cylindrical lens plate between an observation system and a hologram wherein the foregoing disadvantage of deterioration of image quality is obviated by eliminating said zero-order diffracted light.

Figure 2:
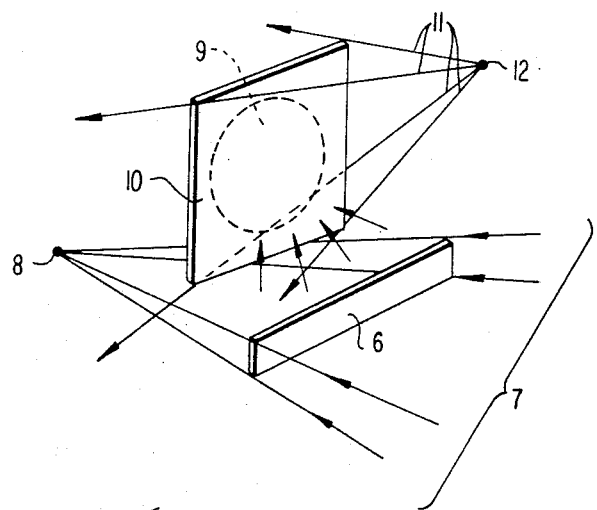
Figure 3:
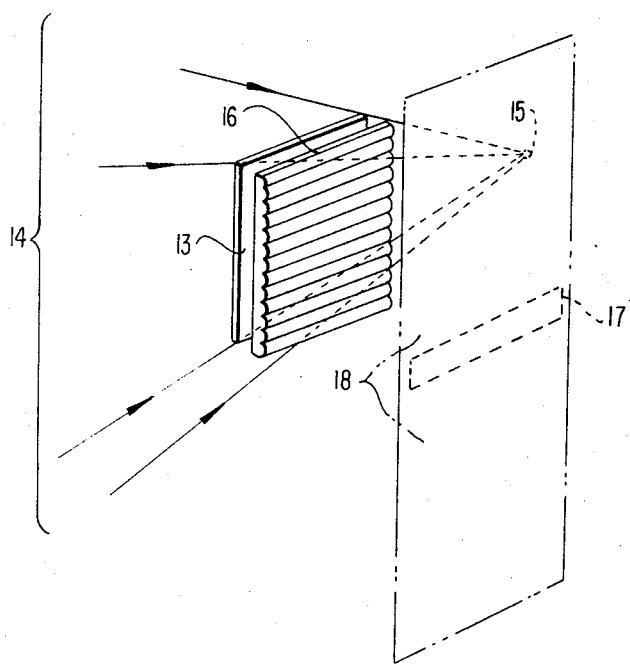
Figure 4:
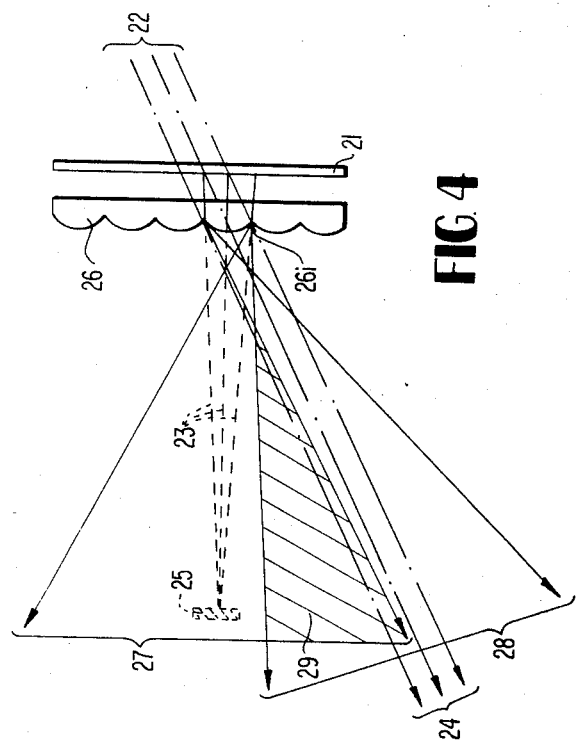
Figure 5:
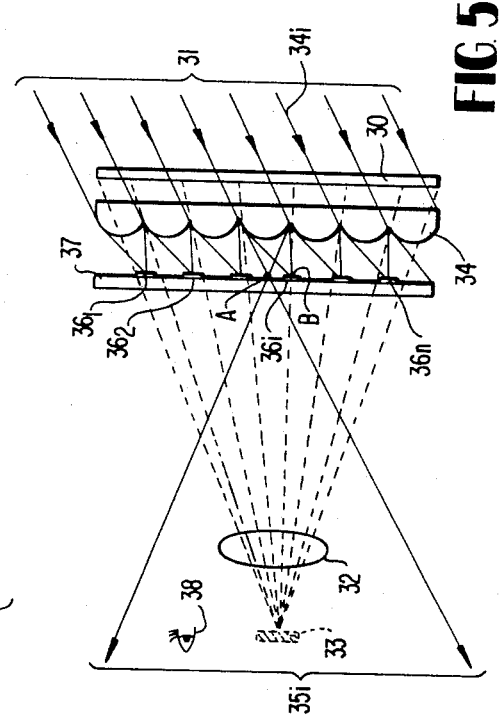

Other objects, features and advantages of the present invention will be made apparent from the following description of the preferred embodiment thereof taken in conjunction with the accompanying drawing in which:

FIG. 1 is a schematic perspective view showing the optical arrangement for performing the first step of the three dimensional image forming method in accordance with present invention, FIG. 2 is a schematic perspective view showing the optical arrangement for performing the second step of the three dimensional image forming method in accordance with the present invention, FIG. 3 is a schematic perspective view showing the optical arrangement for performing the third step of the three dimensional image forming method in accordance with the present invention, FIG. 4 is a vertical side view showing the optical arrangement for reconstructing a hologram according to the prior art, FIG. 5 is a vertical side view showing the optical arrangement for reconstructing a hologram in accordance with the present imvention.

Figure 6:
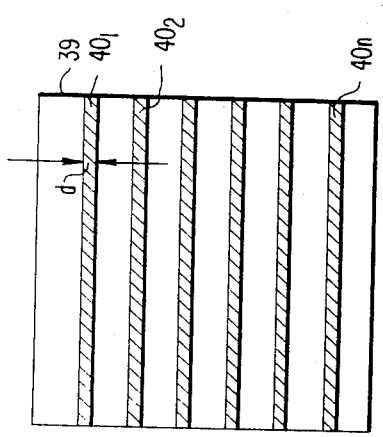
Figure 7:
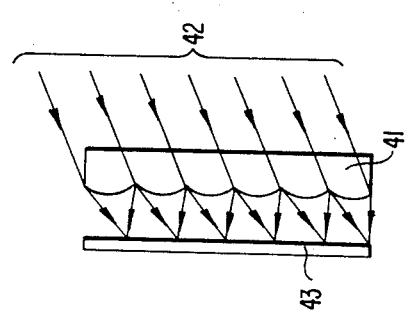

FIG. 6 is a front view of an example of a light shield plate, consisting of a substrate and a light shielding mask, used in the present invention, and FIG. 7 is a vertical side view showing a simple method of making the light shield plate employed in the present invention.

Now referring to FIG. 1 showing the first step of the present invention, the reference numeral 1 indicates a three dimentional object to be recorded and reconstructed, the reference numeral 2 indicates coherent illumination light for illuminating the object 1, 3 indicates an elongated strip of holographic photosensitive material, 4 shows coherent reference light, and 5 shows divergent point of the reference light. When the object is illuminated by the object illuminating light 2, the light is reflected and diffused by the object 1 and impinges on the strip of holographic photosensitive material 3. As the coherent reference light 4 diverged from the point 5 impinges on the strip of holographic photosensitive material at the same time that the diffused light (object light) reflected from the object 1 impinges thereon, the coherent object light and the coherent reference light interfere with each other and the interference pattern is recorded on the strip of holographic photosensitive material 3. By processing the strip of holographic photosensitive material 3 through a photographic chemical treatment, a strip of hologram on which the three dimensional information of the object is recorded is obtained. It should be noted that the parallax in only one direction of the object is recorded on the strip of hologram. The strip of hologram will be hereinbelow referred to simply as "hologram strip," and the strip of holographic photosensitive material will be referred to simply as "holographic film strip" hereinbelow for simplification.

Referring to FIG. 2 showing the second step of the present invention, the reference numeral 6 indicates a hologram strip obtained by the first step of the invention described above, 7 indicates coherent illumination light for reconstruction of the hologram strip 6 which is conjugate with respect to the reference light (indicated at 4 in FIG. 1) at the time of recording, 8 indicates the convergent point (corresponding to the point 5 in FIG. 1) of the reference light 7, 9 shows a real image of the object reconstructed from said hologram strip 6, 10 shows a second holographic photosensitive material located at about the focussing position of the real image, 11 indicates reference light used for recording the real image of the object in a holographic way on the second holographic photosensitive material 10, and 12 designates the divergent point of the reference light 11. The second holographic photosensitive material will be referred to as "holographic film" hereinbelow.

If the hologram strip 6 obtained by the first step of the invention is illuminated by the coherent light 7 which is conjugate with respect to the reference light employed at the time of recording of the hologram, a real image 9 of the object is reconstructed from the hologram strip 6. The holographic film 10 is located at the focussing position of the real image 9 and the real image 9 is recorded on the holographic film 10 in the shape of image hologram by use of the reference light 11. By processing the exposed holographic film 10 through a photographic treatment, an image hologram on which the image of the object is recorded is obtained.

Referring to FIG. 3 showing the third step of the present invention, the reference numeral 13 indicates the image hologram obtained by the second step, 14 indicates illumination light for reconstruction of the image hologram 13 which is conjugate with respect to source point 12 of the reference light (corresponding to the reference light 11 in FIG. 2) employed in recording the image hologram (second step), 15 shows the point of convergence of the illumination light 14 (corresponding to the point 12 in FIG. 2), and 16 designates a cylindrical lens plate located in the vicinity of the image hologram 13 which has curvature only in the direction perpendicular to the lengthwise direction of the real image of the hologram strip reconstructed in the case that the cylindrical lens plate is not present. The reference numeral 17 designates the real image of the hologram strip reconstructed in the case that the cylindrical lens plate 16 is not present, and 18 designates a real image of the hologram strip blurred in the direction perpendicular to the lengthwise direction thereof which is reconstructed in the case that the cylindrical lens plate 16 is present at the position indicated in FIG. 3. The term "blurred" is hereinafter employed to designate the vertical dispersion or broadening of the region of observation of the sharp image. It is to be construed as "dispersed" or "broadened".

As shown in the drawing, if the image hologram 13 obtained in the second step is illuminated by the illumination light 14 for reconstruction conjugate with the reference light employed in recording the hologram, a real image 17 of the hologram strip is reconstructed when there is no cylindrical lens plate 16. However, in the case that the cylindrical lens plate 16 is provided in the vicinity of the image hologram 13, a real image 18 having a large blurred portion extending vertically perpendicular to the lengthwise direction of the real image 17 of the hologram strip is obtained by the light spreading effect of said cylindrical lens plate.

The region from which the three dimensional image recorded on the image hologram 13 can be observed is only within the real image 17 of the hologram strip in the case that the cylindrical lens plate 16 is not present in front of the image hologram 13, but is extended to the whole area of the enlarged real image 18 of the hologram strip when the cylindrical lens plate 16 is used. This effect is equivalent to the effect obtained when the object is recorded directly on a holographic photosensitive material having as large size as that of the blurred real image 18 of the hologram strip (except that the parallax is made in only one direction in the present invention).

The illumination light 14 for reconstruction illumination of the image hologram 13 is not necessarily coherent light as from a laser. Since the hologram 13 is an image hologram, the image of the object can be reconstructed by use of an ordinary light source such as a white light source or a white light source combined with a color filter.

The effect obtained by the use of the cylindrical lens plate having a light expanding characteristic in one direction employed in the third step is explained in detail in the U.S. Pat. application, Ser. No. 276,214, now pending, entitled Reconstruction Method and Apparatus for Holography, wherein a cylindrical lens plate is employed.

The width of the hologram strip employed in the first and second steps of the present invention should necessarily be determined properly taking the detrioration in resolving power due to out-of-focusness in the widthwise direction of the hologram strip and the diffraction caused by the definite size of the strip hologram caused by the use of the cylindrical lens plate into consideration. The amount of blur $\delta_1$ in the lateral direction of the hologram strip of the real image of the object obtained when the cylindrical lens plate is used is represented by the following formula;

$$\delta_1 = ad/(l \pm a), \quad (1)$$

where $l$ is the distance between the hologram strip 6 in the second step and the holographic film 10, $d$ is the width of the hologram strip 6, and $a$ is the distance of the object point measured from the center of the object (provided that the holographic film 10 is located at the center of the real image of the object), and wherein the minus sign represents a case in which the object point is on the hologram strip side from the center of the object and the plus sign represents another case in which the object point on the opposite side thereof. When $l \gg a$, the formula (1) can be represented as $$\delta_1 \sim ad/l. \quad (2)$$

On the other hand, the amount of blur $\delta_2$ in the widthwide direction of the hologram strip of the image of the object caused by diffraction is represented as $$\delta_2 = (l/d)\lambda \quad (3)$$

When the amount of blur represented by the formula (2) and (3) are equal to each another, it is considered that the width $d$ of the hologram strip becomes the optimum. This optimum width $d_{opt}$ is represented by $$d_{opt} = l \cdot \sqrt{\lambda/a} \quad (4)$$

In the case that the illumination light (14 in FIG. 3) for reconstruction used in the third step of the present invention is not a monochromatic light, a colored blur appears in the real image of the hologram strip. This colored blur of the real image of the hologram strip causes a local coloring of the reconstructed image of the object and deterioration of resolving power in the lengthwise direction thereof, if the color dispersion is made in the lengthwise direction of the real image of the hologram strip. If the color dispersion is made in the direction perpendicular to the lengthwise direction of the real image of the hologram strip (i.e. widthwise direction), however, the dispersion of color is uniformalized by the light expanding effect of the cylindrical lens plate and the coloring of the real image of the object and the detrioration of the resolving power in the lengthwise direction are not observed. In order to make the color dispersion in the direction perpendicular to the lengthwise direction of the real image of the hologram strip, the direction of the reference light (11 in FIG. 2) employed in the second step of the present invention with respect to the surface of the holographic film should be carefully determined. One of the ways to determine such an direction of the reference light can be made by first considering an imaginary line passing through the center of the hologram strip 6 and the center of the holographic film 10 in the second step of the present invention as shown in FIG. 2 and then making the angle between said imaginary line and the component of the reference light in the widthwise direction of the hologram strip as large as possible and making the angle between said imaginary line and the component of the reference light in the lengthwise direction thereof as small as possible.

In the case that there is a finite size of the illumination light source for reconstruction (14 in FIG. 3) employed in the third step or in the reference light (11 in FIG. 2) in the second step, that is the light source has a definite area or extent, a blur is seen in the real image of the hologram strip reconstructed in the third step like said color dispersion. The discussion on the direction of the blur is the same as that mentioned in the above case of the color dispersion, and accordingly, the blur made in the lateral direction of the real image does not bring about anything undesirable in the quality of image. In order to make the blur in the lateral direction of the real image of the hologram strip, it is desired to use a reference light (11 in FIG. 2) or illumination light for reconstruction (14 in FIG. 3) having an angular expansion in the lateral direction of the hologram strip.

In the explanation of the steps of the present invention the reference light has been illustrated as a diverging light and the illumination light for reconstruction has been illustrated as a converging light. It should be understood, however, that such illustrations are only for showing examples and the reference light can be converging light or parallel light and the illumination light for reconstruction can be diverging or parallel light.

Further, it will be readily understood that a color image of the object can be reconstructed by use of more than three lights having different wave lengths in each of the three steps of the present invention.

FIG. 4 is a side view for explanation of a disadvantage that the S/N ratio is lowered by a zero-order diffraction light in a method of reconstructing a holographically recorded image by use of a cylindrical lens plate disposed between an observation system and a hologram. Referring to FIG. 4, the reference numeral 21 shows a hologram on which image of the strip hologram are recorded, 22 indicates illumination light for reconstruction, 23 shows diffracted light of first order (or 1-order) diffracted from the hologram 21, 24 shows a zero-order diffracted light from the hologram 21, 25 indicates a real image of the strip hologram, 26 shows a cylindrical lens plate for expanding light only in the direction perpendicular to the lengthwise direction of the real image of the strip hologram, 26i shows one of the cylindrical lenses consituting the cylindrical lens plate 26, 27 shows the first order diffracted light expanded by the cylindrical lens 26i, 28 shows the zero-order diffracted light expanded by the cylindrical lens 26i, and 29 shows a region where the first diffracted light 27 and the zero-order diffracted light 28 expanded by the cylindrical lens 26i come incident to the observation system at the same time. As shown in FIG. 4, if the hologram 21 is illuminated by the illumination light 22 for reconstruction, the first order diffracted light 23 and the zero-order diffracted light from the hologram 24 overlap, and the first order diffracted light 23 is focussed to form a real image 25 of the strip hologram as shown by broken lines when the cylindrical lens plate 26 is not present. In the case that the cylindrical lens plate 26 is not present, the zero-order diffracted light 24 is spatially separated from the real image of the strip hologram 25 being undeviated as indicated by chain lines, and accordingly, the zero-order diffracted light 24 is not incident on the observation system located in the real image area of the strip hologram.

On the other hand, if the cylindrical lens plate 26 is present as shown in FIG. 4, the first order diffracted light is expanded for example as designated by 27 by the lens 26i and accordingly the object image recorded in the hologram can be taken out wherever the viewpoint of the observation system may be within the range of the region covered by the expanded light 27. At the same time, however, the zero-order diffracted light 24 is also expanded by the cylindrical lens 26i as designated at 28 in FIG. 4. Therefore, in the region 29 where both the first diffracted light 27 and the zero-order diffracted light 28 are incident, the S/N ratio is markedly lowered. In order to diminish the common region 29 it is desired to make the angle between the object light and the reference light as large as possible at the time of recording the hologram. If the angle between the object light and the reference light is made large, however, the space frequency of the diffraction pattern recorded on the photosensitive material is increased.

If the space frequency of the diffraction pattern to be recorded on the photosensitive material is increased, the following problems will be found:

1. The photosensitive material is required to have remarkably high resolving power. There is a strict limitation in the selection of the photosensitive material.
2. The image formation process is liable to be subject to influence of turbulence of air and mechanical vibrations.

As described hereinabove with reference to a prior art holographic image forming method using a cylindrical lens plate, when the cylindrical lens plate is used for greatly expanding the light to have a large area from which the image of the objects can be observed, the region in which both the zero-order diffracted light and the primary first order diffracted light are incident to the observation system is enlarged even if the angle between the object light and the reference light be made large. Thus, the image forming method of holography in which a cylindrical lens plate is located between the observation system and the hologram has been disadvantageous in the various points as here mentioned.

The image forming method which obviates the above mentioned disadvantage is discribed referring to FIGS. 5, 6 and 7.

Referring to FIG. 5, the reference numeral 30 indicates a hologram on which an image of the strip hologram is recorded, 31 indicates illumination light for reconstruction, 32 indicates first order diffracted light diffracted from the hologram 30, 33 indicates a reconstructed real image of the fine strip hologram, 34 indicates a cylindrical lens plate for expanding the light only in the lengthwise direction perpendicular to the direction of the real image of the strip hologram, $34i$ indicates one of the cylindrical lenses constituting the cylindrical lens plate, $35i$ designates a part of the first order diffracted light expanded by the cylindrical lens $34i$, $36_1$ to $36_n$ show a set of light shielding masks located at the converging position where the zero-order diffracted light is converged by the cylindrical lens plate 34, 37 designates a substrate for supporting the light shielding masks $36_1$ to $36_n$, and 38 indicates an observation system (for example a pair of eyes).

FIG. 5 shows an arrangement in which a cylindrical lens plate 34 is provided between an observation system 38 and the hologram 30 for reconstructing an image recorded on the hologram and a set of light shielding masks $36_1$ to $36_n$ are provided at the position where the zero-order diffracted light bundles are converged by the cylindrical lens plate. Now, when the hologram 30 is illuminated by the illumination light for reconstruction, the first order diffracted light and the zero-order diffracted light are diffracted by the hologram 30 at the same time. In the case that the cylindrical lens plate is not present, the first order diffracted light 32 is focussed to form a real image 33 of the strip hologram 33, but in case where the cylindrical lens plate 34 is provided as shown in FIG. 5 the first order diffracted light is converged once and then expanded as illustrated.

On the other hand, the zero-order diffracted light is also converged like the first order diffracted light by the cylindrical lens plate 34, but since the light shielding masks $36_1$ to $36_n$ are located at the position of convergence thereof the zero-order diffracted light is shielded from position 33. Therefore, the zero-order diffracted light cannot be observed from the observation system 38 not matter where the point of observation may be located.

For example, with particular reference to one of the cylindrical lenses $34i$ constituting the cylindrical lens plate 34, the first order diffracted light incident into the cylindrical lens $34i$ is converged at the point A in FIG. 5 and becomes the diverging light $35i$. The zero-order diffracted light incident into the cylindrical lens $34i$ is converged at the point B upon a light shield. Such a light shielding effect for beam 31 is made with respect to every zero-order diffracted light with respect to all the other cylindrical lenses. Thus, only the first (or higher) order diffracted light can be incident to the observation system from every cylindrical lens.

FIG. 6 shows an example of the light shielding mask (consisting of the shielding masks and a substrate for support thereof) employed in the present invention. Referring to FIG. 6, the reference numeral 39 indicates a transparent substrate for supporting or bearing a set of light shielding masks $40_1$ to $40_n$. The width d of the light shielding masks $40_1$ to $40_n$ should be properly selected taking aberration of the cylindrical lenses and the size of the light source for the illumination light for reconstruction into consideration. Such a light shielding mask can be easily made for example as follows. As shown in FIG. 7, the illumination light 42 for reconstruction of the holographic image is made incident to the cylindrical lens plate 41 to be used for reconstructing the holographic image from the same direction as that at the time of the actual reconstruction thereof. The illumination light for reconstruction 42 is converged by the cylindrical lens plate 41. At the convergent lines for the illumination light, a photosensitive material 43 is located to receive the light. By exposing the photosensitive material 43 to the converging light as mentioned above, the exposed portion of the photosensitive material 43 is developed black (in case of using a negative type film) and opaque. Thus, a light shielding mask as desired can be obtained. If the photosensitive material is of positive type, the desired mask can be obtained by making the positive type film subject to a reversal development.

If several kinds of illumination light for reconstruction having different direction are used, a light shielding mask is to be located at the position of convergence of the respective zero-order diffracted lights made by a cylindrical lens plate. Even in such a case, however, if the several illumination light bundles coming from different directions are on the same plane perpendicular to the drawing sheet of FIG. 5, the zero-order diffracted light can be shielded by a single shielding mask since such different zero-order diffraction light bundles have nearly the same convergence lines.

Althrough the illumination light 31 for reconstruction employed in the explanation of FIG. 5 is illustrated as parallel light, it will be apparent that the illumination light can be divergent light or convergent light for carrying out the present invention.

Further, it will be readily understood that the present invention can be applied not only to the reconstruction of a hologram on which an image of the strip hologram are recorded, but also to the reconstruction of a hologram of different type in which a cylindrical lens plate is disposed between an observation system and a hologram, for example the reconstruction of the hologram on which a number of lined fine aperture images having different information are recorded.

What is claimed is:

1. A method of forming a holographic image comprising a first step of recording a holographic image of an object on a strip of holographic material having width and lengthwise dimensions, a second step of reconstructing a real image of the object from the hologram strip obtained by said first step, positioning a second holographic photosensitive material substantially at the focussing position of said real image, and recording said image of the object on said second holographic photosensitive material as an image hologram, and a third step comprising illuminating said image hologram obtained by said second step to reconstruct a real image of said hologram strip, spreading the light diffracted by said image hologram, by means of a cylindrical lenticular lens plate positioned adjacent said image hologram, in a direction perpendicular to the lengthwise direction of said image of said hologram strip, and blocking substantially only the zero-order light diffracted by said image hologram and focussed by said cylindrical lens plate, whereby an image of said object is formed which is observable within a wide angle and which has improved contrast.

2. A method of forming an image by the method of claim 1 wherein said step of blocking comprises positioning light shielding masks at the locations where the zero-order light is focussed by said cylindrical lens plate.

3. A method of forming an image according to claim 2 wherein said mask comprises a transparent substrate having opaque light shielding portions only where said zero-order light is focussed.

4. A method of forming an image according to claim 1 wherein the width of said hologram strip is substantially equal to $l\sqrt{\lambda/a}$ where $l$ is the distance between said hologram strip and said second holographic photosensitive material in said second step, "$a$" is the distance of some point in the object measured from the center of the object, and $\lambda$ is wave length of the light used in said second step.

5. A method of forming an image according to claim 1 wherein the light used in each step has a plurality of different wave length components so that a color image is reconstructed in said third step.

6. An image forming method according to claim 1 wherein the step of illuminating said image hologram comprises arranging several light sources along a line parallel to the lengthwise direction of said image of said hologram strip.

* * * * *